United States Patent

Eisenhut et al.

[11] Patent Number: 5,401,279
[45] Date of Patent: Mar. 28, 1995

[54] FILLING MAT-IMMOBILIZED-ELECTROLYTE BATTERIES

[75] Inventors: Neil R. Eisenhut, Anderson; Dennis W. Hercamp, Pendleton, both of Ind.

[73] Assignee: General Motors Corporation, Detroit, Mich.

[21] Appl. No.: 172,790

[22] Filed: Dec. 27, 1993

[51] Int. Cl.$^6$ .............................................. H01M 6/00
[52] U.S. Cl. .................................. 29/623.5; 29/623.1; 429/52; 429/118
[58] Field of Search ........................ 429/52, 118, 623.5, 429/623.1

[56] References Cited

U.S. PATENT DOCUMENTS 4,743,270  5/1988  McCartney, Jr. et al. ........ 29/623.1
4,980,249 12/1990  Isoi et al. .............................. 429/122
5,201,924  4/1993  Mix et al. .............................. 29/623.5
5,240,468  8/1993  Willmann et al. ................. 29/623.5

Primary Examiner—Prince Willis, Jr.
Assistant Examiner—M. Nuzzolillo
Attorney, Agent, or Firm—Lawrence B. Plant

[57] ABSTRACT

Filling a mat-immobilized-electrolyte battery with electrolyte. The battery's container includes a cover having two openings therein. The battery is laid on its side and electrolyte introduced thereinto through the lowermost opening. The electrolyte enters the battery at substantially the wicking rate of the electrolyte into the mat and displaces gases therefrom through the upper opening. Preferably, the battery will lay on its side in a tank of electrolyte whose level is just below the upper openings.

7 Claims, 1 Drawing Sheet

FILLING MAT-IMMOBILIZED-ELECTROLYTE BATTERIES

This invention relates to filling mat-immobilized-electrolyte, Pb-acid electric storage batteries (e.g., gas-recombination batteries) with electrolyte.

BACKGROUND OF THE INVENTION

Mat-immobilized-electrolyte type, Pb-acid, electric batteries include at least one galvanic cell element comprising opposite polarity electrodes (e.g., positive and negative plates) separated one from the other by a porous, absorbent mat (e.g., fibrous polypropylene, Dynel, glass, etc.). The mat is typically compressed between the electrodes and capillarily immobilizes the battery's electrolyte within the cell element. One such battery is described in U.S. Pat. No. 3,853,626 filed Dec. 20, 1968 in the names of Corbin et al and assigned to the assignee of the present invention.

Mat-immobilized-electrolyte batteries may be either of the "flooded" electrolyte type or "starved" electrolyte type. Flooded-electrolyte-type batteries have the mat and electrodes saturated with electrolyte in that the volume of the electrolyte substantially equals or exceeds the void volume of the pores within the mat and the electrodes. Starved-electrolyte-type batteries, on the other hand, have considerably less electrolyte volume than the void volume of the pores within the mat and the electrodes. So-called gas-recombinant batteries, for example, operate in a starved electrolyte condition wherein electrolyte volume is only about 60% to 90% of the available void volume within the mat and electrodes and thereby provide sufficient void space therein to permit migration of oxygen from the positive electrode directly to the negative electrode for consumption thereat.

Conventional (i.e., mat-free) lead-acid storage batteries are commonly manufactured by placing the cell elements in the battery container in the unformed (i.e., uncharged) state wherein the positive and negative electrodes both comprise essentially lead oxide. Thereafter $H_2SO_4$ forming acid is metered into the cell compartment atop the elements until the compartment is filled. The electrodes are subsequently electrolytically formed (i.e., initially charged) by passing a forming current therethrough. In some cases, the residual forming acid is then dumped and fresh acid substituted therefor as the working electrolyte. In other instances, the forming acid has sufficient residual strength to remain in the battery as the working electrolyte. Between the time the forming acid is added and the formation process begins, the sulfuric acid reacts exothermically with the lead oxide to form lead sulfate in both the positive and negative electrodes in a process often referred to as "pickling". The initial pickling reaction is quite vigorous and results in the generation of considerable heat and some gas. The initial pickling reaction subsides considerably after about the first several minutes following acid addition as the acid weakens (i.e., becomes more dilute), the electrodes become sulfated and the lead oxide available for reaction decreases.

Electrolytic formation of the battery follows pickling and involves passing forming current through the battery to convert the lead sulfate in the electrodes to lead dioxide in the positive electrodes, lead in the negative electrodes and to reconstitute sulfuric acid in the electrolyte. The electrolytic formation process adds considerable heat to the battery thereby causing the temperature of the elements to increase significantly. High element temperatures during formation causes the gassing overvoltage of the electrodes to drop which in turn undesirably causes excessive gassing. Hence it is desirable to have the element temperature as low as possible at the beginning of formation so that undesirably high temperatures are not reached during formation. In mat-free batteries, the batteries can cool sufficiently by standing for about 30 to 60 minutes following pickling so as not to significantly affect gassing. Batteries containing glass mats however retain the heat for significantly longer periods of time.

In conventional, mat-free batteries excess gassing during formation, while undesirable, can nonetheless be tolerated as the gas can readily escape the element from between the plates. For mat-containing batteries, however, gassing during formation must be kept to a minimum in order to prevent any gas from becoming entrapped within the mat causing so-called "dry spots" therein where little or no acid is present. In this regard, dry spots, whether formed during the pickling or formation reactions, will not only interfere with the formation reaction by causing incomplete formation in some regions of the electrodes and increased current densities in other regions thereof, but ultimately results in undesirable lead treeing (i.e., dendrite growth) between the plates, reduced battery capacity and cold cranking performance, as well as shortened cycle life.

Filling mat-immobilized-electrolyte type batteries with electrolyte by dispensing the electrolyte atop the cell element after the cell elements have been placed in their container can have a detrimental affect on the performance of the battery. In this regard, when so filled, the mats often make it difficult to obtain uniform distribution of acid throughout the cell element; result in vaporization of the electrolyte within the cell element during pickling; and/or result in mats containing pockets of trapped gases (i.e., dry spots). More specifically, electrolyte introduced into the container atop the cell element percolates down through the cell element from the top thereof, thereby trapping air within the element as well as preventing the ready escape of the gases and heat generated during the pickling reaction. As a result, not only are dry spots prevalent, but the temperature of the element is elevated to an undesirably high level and retains the heat for a prolonged period of time. Moreover, the concentration of the electrolyte within the cell element tends to vary from one location to the next. One reason for this is the stratification that occurs by virtue of the electrolyte front's descending down through the cell element. As the electrolyte front (i.e., the initial few centimeters of the electrolyte wave moving into the element) advances into the element, it is more rapidly depleted of its $H_2SO_4$ content then is the electrolyte tracking behind the front. As a result, by the time the liquid front moves into the center of the element, it has much lower sulfuric acid concentration than the acid tracking behind it. If the wicking rate (i.e., the rate at which the $H_2SO_4$ wicks or is capillarily drawn through the mat separating the plates) and starting acid temperature are slow and high (e.g., ambient temperature) respectively, it is possible to end up with a slightly alkaline aqueous solution in the middle of the element. This results in high $Pb^{++}$ solubility due to the high pH and high temperatures. If this solubility is high and remains high even for only several minutes, the soluble lead migrates into the separators where it is converted to lead which electrically bridges (i.e., shorts) adjacent electrodes during formation and/or subsequent charging. This concentration imbalance effects the conductivity of the electrolyte at different locations in the element which in turn affects current density distribution during formation. Another reason for electrolyte concentration variations is the formation of dry spots (i.e., trapped gases) discussed above. Eventually, acid will infiltrate even into the dry spots, at least to some extent, but is quickly consumed by the unformed PbO in the regions of the electrodes adjacent the dry spots resulting in pockets of low concentration acid within the element. Finally, because mat-immobilized electrolyte elements do not take up electrolyte as quickly as mat-free elements, care must be taken to meter the electrolyte into the container atop the element at a sufficiently slow rate as to preclude overflow thereof from the top of the container above the cell element.

McCartney, Jr. et al 4,743,270 proposes to minimize some of the aforesaid problems by putting the electrolyte into the container first, and then immersing the cell element slowly into the electrolyte. This technique is relatively slow and causes the acid to contact and contaminate the plate lugs and interferes with the subsequent welding of the lugs to the battery's plate straps used to connect the several plate lugs of like polarity.

Galyen et al 5,201,924 proposes to minimize some of the aforesaid problems by pumping electrolyte down the side of the battery element via a nozzle and into the bottom of the battery container beneath the battery element so that the electrolyte can rise upwardly through the cell element displacing overhead gases as it rises. This technique virtually eliminate entrapped gases and results in a cooler battery at the commencement of formation which immediately follows filling. However, this technique requires specialized production equipment (e.g., acid feeding nozzles and acid metering equipment) and offers an increased risk of damaging the edges of the elements during insertion of the nozzle.

OBJECT OF THE INVENTION

It is an object of the present invention to provide a unique, simple, and effective method of filling mat-immobilized-electrolyte, lead-acid storage batteries with electrolyte so as (1) to substantially avoid the entrapment of air and pickling gases within a cell element during filling, (2) to dissipate the heat generated therein during pickling, (3) not to damage the edges of the cell elements, and (4) not to require complicated production equipment (e.g., acid metering and injection equipment). This and other objects and advantages of the present invention will become readily apparent from the detailed description thereof which follows, and which is given hereafter in conjunction with the several drawings in which:

BRIEF SUMMARY OF THE INVENTION

The present invention comprehends a method for filling a mat-immobilized-electrolyte type, Pb-acid storage battery with electrolyte wherein a quantity of sulfuric acid sufficient to wet substantially the entire internal surface area of the mats and electrodes is introduced into the cell container essentially beneath the cell element and allowed to rise in the cell element at essentially the wicking rate of the acid on the mat. More specifically, the element is placed in the container and a cover placed on the container. Then with the battery laying on its side, acid is introduced beneath the cell element (i.e., as viewed with the battery on its side) via a first opening in the cover and then rises up through the cell element displacing air and gases as the front moves upwardly. Displaced gases are vented from the container via a second opening in the cover. Under these conditions, any gases generated during the initial pickling reaction, as well as any air in the mat, can freely vent from the element via the pores in the as yet unwetted portions of the mat. Such venting of the gases through the unwetted portion of the mat and displacement thereof upwardly out of the element by the upwardly moving front of the electrolyte virtually eliminates the formation of pockets of gas or dilute electrolyte within the element.

Filling mat-immobilized batteries according to the present invention also results in a much cooler cell element at the commencement of formation (i.e., for a given stand time) than similar batteries filled such that the acid percolates down through the element. In this regard, introducing the acid from beneath the element and allowing it to move upwardly through the element permits the heat generated by the initial pickling reaction to be readily removed from the cell element primarily by the cooling effect of the electrolyte front as it moves up through the element and carries the heat from the innards of the element to the top thereof where it can be readily dissipated. The relatively high heat capacity of the electrolyte (i.e., about four times that of the electrodes) causes the electrolyte front to act like a heat sink which absorbs the heat from the electrodes as it moves past the reaction zone toward the top of the element. Batteries so filled can cool sufficiently to commence formation in less time than mat-immobilized-electrolyte-type batteries filled from the top.

According to a preferred embodiment of the invention, the battery is simply laid on its side in a tank of acid such that the first opening lies beneath the acid level in the tank and the second opening lies above the acid level in the tank. In another embodiment, immersion in the acid tank is eliminated and the first openings plumbed to a remote source of electrolyte.

DETAILED DESCRIPTION OF SPECIFIC EXAMPLES OF THE INVENTION

Figure 1:
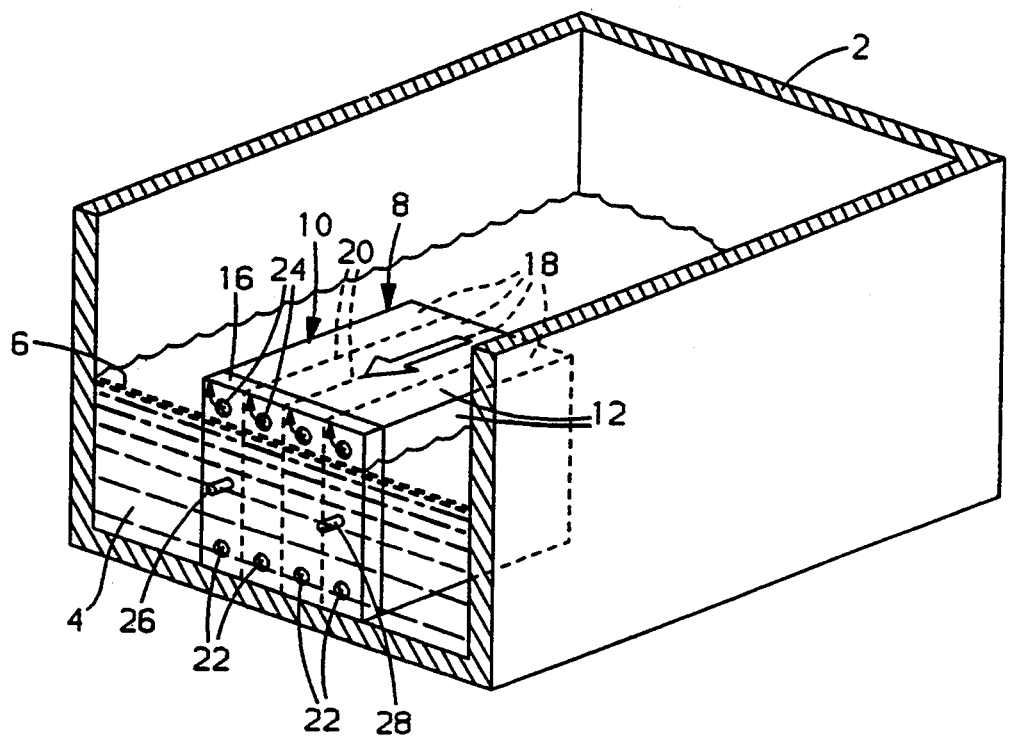
FIG. 1 is an isometric illustration of a battery being filled in accordance with one embodiment of the present invention.

FIG. 1 depicts a tank 2 containing sulfuric acid electrolyte 4 to a level 6. A mat-immobilized-electrolyte, gas-recombinant-type lead-acid battery 8 is positioned in the tank 2 as shown. More specifically, the battery 8 comprises a container 10 defined by a plurality of walls 12. A cover 16 closes off the container 10. The container 10 may be divided into a plurality of individual cells 18 by internal partitions 20. The cover 16 includes a set of openings 22 and 24 overlying each cell 18 (i.e., when the battery is upright). A pair of terminals 26 and 28 project from the cover 16 for connecting the battery to an external load. The battery 8 is laid on its side such that one row of openings 22 lies beneath the level 6 of the electrolyte 4 and one row of the openings 24 lies just above the level 6 of the electrolyte 4. The electrolyte 4 enters the container 10 through the openings 22 as the mat and electrodes soak up the electrolyte. More specifically, the electrolyte enters the openings 22 and begins to fill the container 10 at a rate commensurate with the wicking rate of the electrolyte with respect to the immobilizing mat (e.g., glass mat) between the positive and negative electrodes. In order to insure that the battery does not fill at a rate substantially greater than such wicking rate, the cross-sectional area of each of the openings 24 is controlled so as to vent the gases from within the container at a rate which prevents too rapid a filling of the container. In this regard, if the acid gushes too fast into the container through the openings 22, it will trap air within the battery element leaving detrimental air pockets therein as discussed above. The level of the electrolyte 4 in the tank 2 will preferably be just below the openings 24 so as to insure complete wetting of the glass mat within the cell element.

Figure 2:
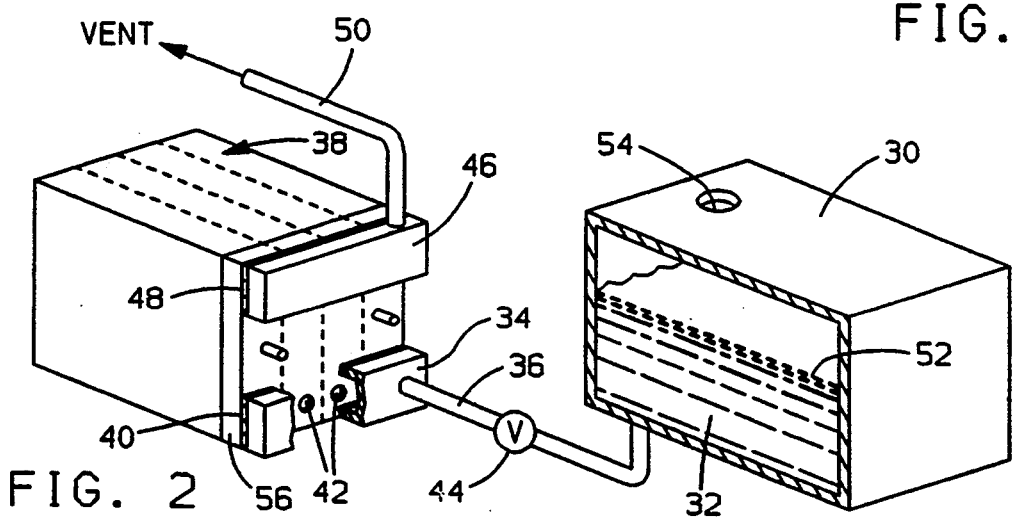
FIG. 2 is an isometric illustration of a battery being filled in accordance with another embodiment of the present invention.

FIG. 2 shows another embodiment of the subject invention wherein a tank 30 containing acid electrolyte 32 is connected to a manifold 34 via conduit 36. The manifold 34 is held firmly in place against the battery 38 with a gasket 40 therebetween to prevent leakage of any acid 32 therefrom. The manifold 34 covers the several openings 42 and acid is supplied thereto via the conduit 36. A valve 44 in the conduit 36 is used to control the flow rate and total volume of acid 32 supplied to the battery 38. A second manifold 46 may be held firmly against the battery 38 over the upper openings (not shown), with gasket 48 therebetween, and any gases exiting the upper openings pass through the manifold 46 and out the exhaust pipe 50. In this embodiment, the level 52 of the acid 32 may be above the level of the vent openings in the battery 38. An opening 54 in the tank 30 allows the tank 30 to vent and thus maintain atmospheric pressure therein.

Figure 3:
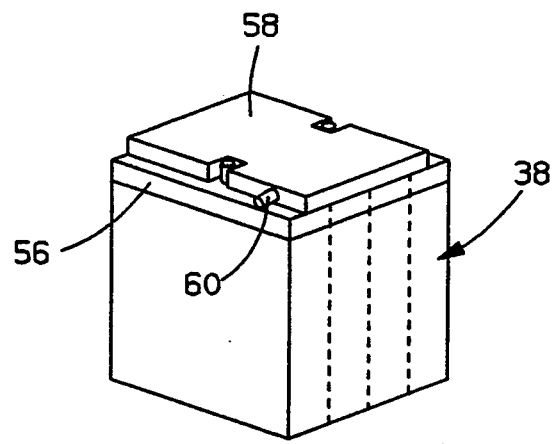
FIG. 3 is an isometric illustration of a covered battery after filling.

After the battery has been filled, it is returned to the upright position shown in FIG. 3 and the openings (not shown) in the cover 56 covered with a secondary cover 58. The secondary cover 58 will preferably include a manifold vent system connecting the several openings together for venting the container 10 to the atmosphere via an appropriate outlet 60.

To illustrate the invention and by way of specific example, a battery comprising a plurality of cells was filled as follows. The volume of each cell compartment was 904 cm$^3$ and contained an electrochemically active cell element having a volume of about 800 cm$^3$. The acid fill holes (i.e., beneath the acid) each had a cross-sectional area of 4.1 cm$^2$ and lay in a row about 28 mm from the centerline of the battery. A plurality of vent openings lay in a row parallel to the fill openings at a distance of about 30 mm from the centerline of the battery, and each had a cross-sectional area of 0.3 cm$^2$ (i.e., a $\frac{1}{4}$ in. diameter). More specifically, the container was laid on its side such that the level of the acid (i.e., at room temperature and 1,250 specific gravity) in the tank lie just below the vent hole. The battery remained on its side for 5 minutes until the glass mat separating the electrodes was wetted by and had absorbed 490 milliliters of acid. Thereafter, the battery was retained to the upright position and an additional 40 milliliters of acid added to the top of each element. The additional 40 milliliters of acid was required to insure sufficient acid to wet the internal surfaces of the electrodes. Complete wetting of the electrodes could take upwards of about 1 hour. The values set forth above will vary considerably depending on the physical properties of the mat, the degree of its compression and the concentration and temperature of the acid.

While the invention has been described primarily in terms of specific embodiments thereof, it is not intended to be limited thereto but rather only to the extent set forth hereafter in the claims which follow.

The embodiments of the invention in which an exclusive property or privilege is claimed as defined as follows:

1. In a method of assembling a mat-immobilized-electrolyte Pb-acid storage battery comprising the principle steps of assembling a galvanic cell element containing compressible, absorbent mats sandwiched between positive and negative polarity electrodes, compressing said element so as to compress said mats, inserting at least one said compressed element into a container, and impregnating said element with said electrolyte while in said container, the improvement comprising:

positioning a cover on said container, said cover having a first and second opening therein overlying each of said battery's elements, said first opening lying near one side of said battery on one side of a centerline of said battery and said second opening lying near another side of said battery opposite said one side and on the opposite side of said centerline;

laying said battery on said one side such that said second opening is above said first opening;

introducing electrolyte into said container through said first opening;

allowing said electrolyte to capillarily rise throughout said element so as to wet substantially the entire internal surface of said mats at substantially the wicking rate of said electrolyte in said mat, but without completely saturating said element;

displacing any gases in said container with said rising electrolyte and venting them from said container through said second opening;

placing said battery in an upright position such that said openings overlie said element;

adding additional electrolyte to said battery sufficient to insure substantially complete wetting of said electrodes; and covering said openings.

2. A process according to claim 1 including the step of positioning a second cover over said openings.

3. A process according to claim 2 wherein said second cover includes a manifold for venting said battery to the atmosphere.

4. A process according to claim 1 including the step of laying said battery on said one side in a tank of said electrolyte such that said first opening is below and said second opening is above the surface of said electrolyte in said tank.

5. A process according to claim 1 wherein the pressure of the electrolyte at said first opening is greater than the hydrostatic head of said electrolyte would be if the height of the electrolyte above the first opening were equal to the distance between said first and second openings.

6. A process according to claim 1 including the step of controlling the size of the second opening to control the rate at which the electrolyte enters the container.

7. A process according to claim 6 wherein said second opening has a cross sectional area equivalent to an opening having a diameter equal to about $\frac{1}{4}$ in.

* * * * *